United States Patent
Nezu et al.

(10) Patent No.: US 6,817,454 B2
(45) Date of Patent: Nov. 16, 2004

(54) DAMPING FORCE CONTROL TYPE HYDRAULIC SHOCK ABSORBER

(75) Inventors: Takashi Nezu, Kanagawa (JP); Yohei Katayama, Kanagawa (JP)

(73) Assignee: Tokico Ltd., Kanagawa-ken (JP)

( * ) Notice: Subject to any disclaimer, the term of this patent is extended or adjusted under 35 U.S.C. 154(b) by 0 days.

(21) Appl. No.: 10/316,040

(22) Filed: Dec. 11, 2002

(65) Prior Publication Data

US 2003/0106753 A1 Jun. 12, 2003

(30) Foreign Application Priority Data

Dec. 12, 2001 (JP) ........................................ 2001-378753

(51) Int. Cl.⁷ .................................................. F16F 9/46
(52) U.S. Cl. .............................. 188/282.2; 188/322.15
(58) Field of Search ........................ 188/282.2, 322.15, 188/266.2, 266.5, 266.6, 282.3, 282.4, 318, 282.7

(56) References Cited

U.S. PATENT DOCUMENTS

| | | | | |
|---|---|---|---|---|
| 4,624,346 A | * | 11/1986 | Katz | 188/282.2 |
| 5,143,185 A | * | 9/1992 | Klein et al. | 188/282.2 |
| 5,201,388 A | * | 4/1993 | Malm | 188/282.2 |
| 5,392,883 A | * | 2/1995 | Huang et al. | 188/282.2 |
| 5,454,452 A | * | 10/1995 | Ohlin | 188/282.2 |
| 5,927,449 A | * | 7/1999 | Huang et al. | 188/282.2 |

* cited by examiner

*Primary Examiner*—Matthew C. Graham
(74) *Attorney, Agent, or Firm*—Wenderoth, Lind & Ponack L.L.P.

(57) ABSTRACT

A piston connected to a piston rod is slidably fitted in a cylinder having a hydraulic fluid sealed therein. First and second poppet valves having different valve opening characteristics are provided in first and second extension main passages, respectively. A pilot control valve is provided in a sub-passage. The control pressure of the pilot control valve is adjusted by a proportional solenoid, thereby controlling damping force. At the same time, the pressure at the upstream side of the pilot control valve is introduced into back-pressure chambers to adjust the valve opening pressures of the first and second poppet valves. Because the first and second poppet valves are sequentially opened or closed, damping force can be controlled stepwisely, and ideal damping force characteristics can be obtained.

13 Claims, 5 Drawing Sheets

DAMPING FORCE CONTROL TYPE HYDRAULIC SHOCK ABSORBER

BACKGROUND OF THE INVENTION

The present invention relates to a damping force control type hydraulic shock absorber attached to a suspension system of a vehicle, for example, an automobile.

Hydraulic shock absorbers attached to suspension systems of automobiles or other vehicles include damping force control type hydraulic shock absorbers that are designed so that damping force characteristics can be appropriately controlled in accordance with road surface conditions, vehicle running conditions, etc. with a view to improving ride quality and steering stability.

In general, a damping force control type hydraulic shock absorber includes a cylinder having a hydraulic fluid sealed therein. A piston is slidably fitted in the cylinder to divide the inside of the cylinder into two chambers. The piston is connected with a piston rod to form a piston assembly. The piston assembly is provided with a main hydraulic fluid passage and a bypass passage, which provide communication between the two chambers in the cylinder. The main hydraulic fluid passage is provided with a damping force generating mechanism including an orifice, a disk valve, etc. The bypass passage is provided with a damping force control valve for varying the passage area of the bypass passage to control damping force.

When the bypass passage is opened through the damping force control valve, the flow resistance to the hydraulic fluid flowing between the two chambers in the cylinder is reduced, thereby reducing damping force. When the bypass passage is closed, the flow resistance between the two chambers is increased, thereby increasing damping force. Thus, damping force characteristics can be appropriately controlled by opening or closing the damping force control valve.

The above-described damping force control type hydraulic shock absorber, in which damping force is controlled by varying only the passage area of the bypass passage, has the following disadvantage. Although the damping force characteristics can be changed to a considerable extent in a low piston speed region because damping force depends on the restricting action of the orifice in the hydraulic fluid passage, the damping force characteristics cannot greatly be changed in intermediate and high piston speed regions because in these regions damping force depends on the degree of opening of the damping force generating mechanism (disk valve, etc.) in the main hydraulic fluid passage.

Under these circumstances, Japanese Patent Application Unexamined Publication (KOKAI) No. Hei 7-332425 (corresponding U.S. Pat. No. 5,655,633; corresponding Offenlegungsschrift DE 195 18 560 A1), for example, discloses a damping force control type hydraulic shock absorber in which a pilot-operated damping valve control valve is provided as a damping force generating mechanism in a main hydraulic fluid passage common to the extension and compression sides. In the pilot-operated damping valve control valve, a back-pressure chamber (pilot chamber) is formed at the back of a disk valve. The back-pressure chamber is communicated with a cylinder chamber at the upstream side of the disk valve through a fixed orifice and also communicated with a cylinder chamber at the downstream side of the disk valve through a variable orifice (pilot control valve).

According to the above damping force control type hydraulic shock absorber, the area of the communicating passage between the two chambers in the cylinder is controlled directly by opening or closing the variable orifice. Moreover, the valve opening pressure of the disk valve can be varied by changing the pressure in the back-pressure chamber by the pressure loss in the variable orifice. Thus, it is possible to control orifice characteristics (in which damping force is approximately proportional to the square of the piston speed) and valve characteristics (in which damping force is approximately proportional to the piston speed) and hence possible to widen the control range of damping force characteristics.

However, the above-described conventional damping force control type hydraulic shock absorber having a pilot-operated damping force control valve suffers from the following problem. The pilot-operated damping force control valve is a pressure control valve and generates substantially constant damping force irrespective of the piston speed. This is convenient for controlling the vibration of a sprung member. However, damping force is likely to become insufficient for the vibration of an unsprung member. In addition, because the damping force characteristics change rapidly when the valve is opened, vibration and noise are likely to be generated. Further, because a disk valve is used as the pilot-operated damping force control valve, the set load and the spring constant vary to a considerable extent, and the arrangement is disadvantageous in terms of durability. It should be noted that the damping force characteristics can be controlled to a certain extent by disposing a sub-valve (disk valve) in series to the pilot-operated damping force control valve. In such a case, however, it becomes difficult to set the "soft"-characteristic damping force at a sufficiently small value because the damping force of the sub-valve is added to that of the pilot-operated damping force control valve.

SUMMARY OF THE INVENTION

The present invention was made in view of the above-described circumstances.

Accordingly, an object of the present invention is to provide a damping force control type hydraulic shock absorber having a pilot-operated damping force control valve, which is capable of obtaining ideal damping force characteristics.

The present invention provides a damping force control type hydraulic shock absorber including a cylinder having a hydraulic fluid sealed therein. A piston is slidably fitted in the cylinder. A piston rod is connected at one end thereof to the piston. The other end of the piston rod extends to the outside of the cylinder. A hydraulic fluid passage allows the hydraulic fluid to flow therethrough in response to the sliding movement of the piston. A pilot-operated damping force control valve generates damping force by controlling the flow of the hydraulic fluid in the hydraulic fluid passage. The pilot-operated damping force control valve includes a plurality of main damping valves different from each other in valve opening characteristics and a single pilot control valve for controlling the pilot pressure of the plurality of main damping valves.

With this arrangement, the plurality of main damping valves constituting the pilot-operated damping force control valve are sequentially opened or closed, thereby allowing damping force to be controlled stepwisely.

The above and other objects, features and advantages of the present invention will become more apparent from the following description of the preferred embodiments thereof, taken in conjunction with the accompanying drawings.

DETAILED DESCRIPTION OF THE INVENTION

Embodiments of the present invention will be described below in detail with reference to the accompanying drawings.

A first embodiment of the present invention will be described with reference to FIGS. 1 to 3.

Figure 3:
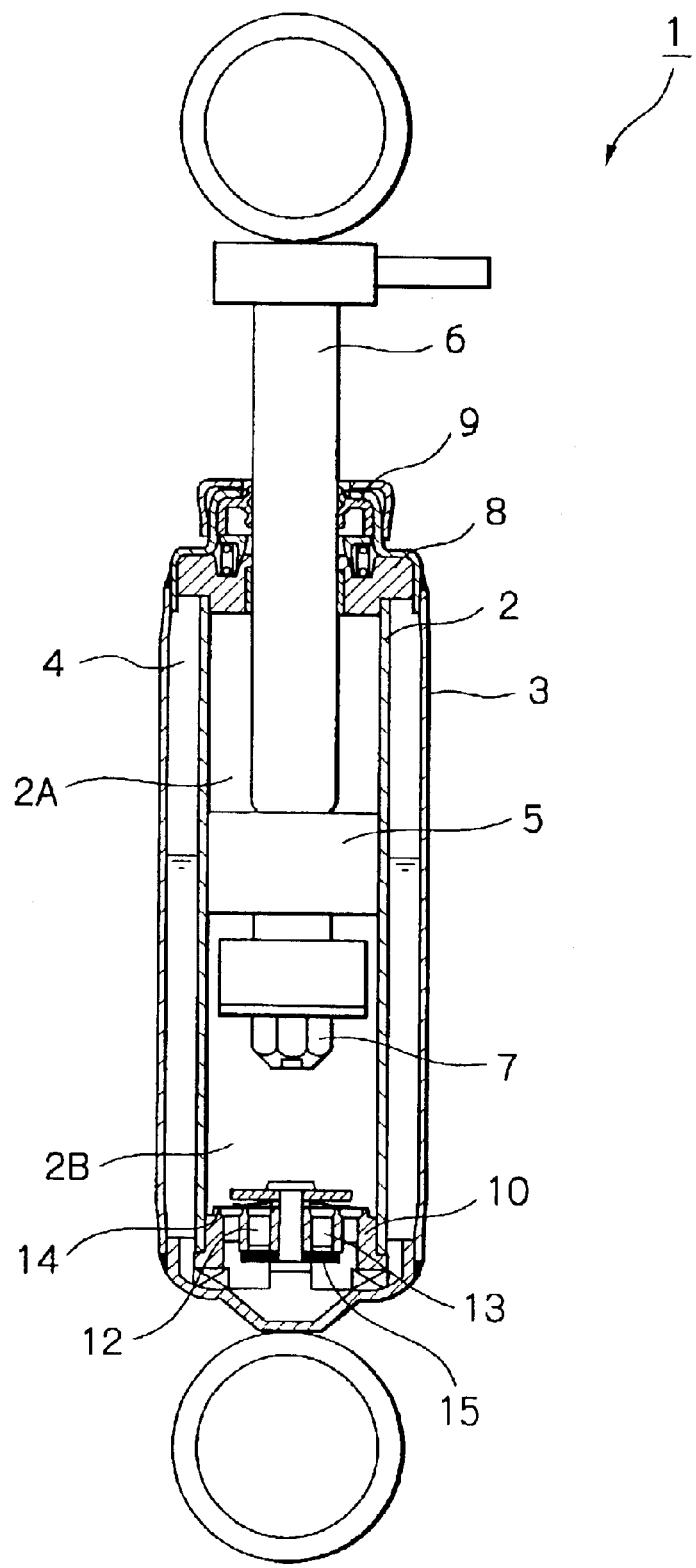
FIG. 3 is a vertical sectional view of the damping force control type hydraulic shock absorber shown in FIG. 1.

As shown in FIG. 3, a damping force control type hydraulic shock absorber 1 according to the first embodiment has a double-cylinder structure comprising an inner cylinder 2 and an outer cylinder 3 provided around the outer periphery of the inner cylinder 2. A reservoir 4 is formed between the cylinder 2 and the outer cylinder 3. A piston 5 is slidably fitted in the cylinder 2. The piston 5 divides the inside of the cylinder 2 into two chambers, (i.e. a cylinder upper chamber 2A and a cylinder lower chamber 2B). One end portion of a piston rod 6 is connected to the piston 5 with a nut 7. The other end portion of the piston rod 6 extends through a rod guide 8 and an oil seal 9, which are fitted to the upper end portion of the double-cylinder structure comprising the cylinder 2 and the outer cylinder 3. The end portion of the piston rod 6 projects to the outside. A base valve 10 is provided in the lower end portion of the cylinder 2 to divide the cylinder lower chamber 2B and the reservoir 4 from each other. The cylinder upper and lower chambers 2A and 2B have a hydraulic fluid sealed therein, and the reservoir 4 also has the hydraulic fluid sealed therein, together with a gas.

The piston 5 is provided with a damping force generating mechanism 11 (see FIG. 1) for generating damping force by controlling the flow of hydraulic fluid between the cylinder upper and lower chambers 2A and 2B. The base valve 10 is provided with an extension hydraulic fluid passage 12 and a compression hydraulic fluid passage 13 for communication between the cylinder lower chamber 2B and the reservoir 4. The extension hydraulic fluid passage 12 is provided with a check valve 14 that allows the hydraulic fluid to flow through the hydraulic fluid passage 12 in only one direction from the reservoir 4 toward the cylinder lower chamber 2B. The compression hydraulic fluid passage 13 is provided with a damping valve 15 comprising an orifice and a disk valve to offer resistance to the hydraulic fluid flowing through the compression hydraulic fluid passage 13 from the cylinder lower chamber 2B toward the reservoir 4.

Next, the damping force generating mechanism 11 will be described with reference to FIG. 1. It should be noted that FIG. 1 shows the damping force generating mechanism 11 schematically.

Figure 1:
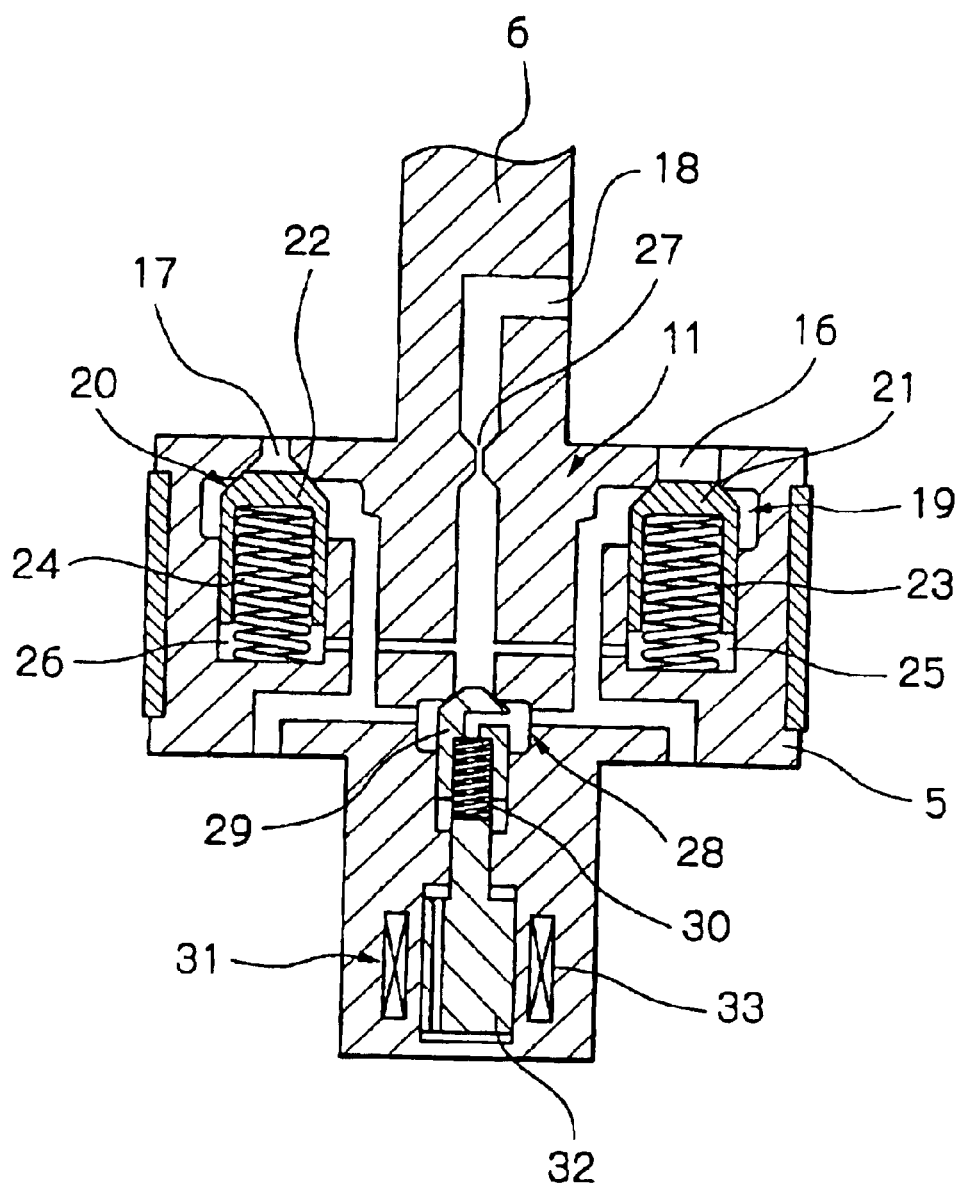
FIG. 1 is a vertical sectional view schematically showing a piston part as an essential part of a damping force control type hydraulic shock absorber according to a first embodiment of the present invention.

As shown in FIG. 1, the piston 5 is provided with first and second extension main passages 16 and 17 (hydraulic fluid passages) and a sub-passage 18, which provide communication between the cylinder upper and lower chambers 2A and 2B. The first and second main passages 16 and 17 are respectively provided with first and second poppet valves 19 and 20 (main damping valves) adapted to open upon receiving the pressure of hydraulic fluid from the cylinder upper chamber 2A. The first and second poppet valves 19 and 20 are respectively provided with valve springs 23 and 24 for urging valving elements 21 and 22 in the valve closing direction. In addition, back-pressure chambers 25 and 26 are provided at the back of the valving elements 21 and 22 so that the pressures in the back-pressure chambers 25 and 26 act on the valving elements 21 and 22 in the valve closing direction.

The first and second poppet valves 19 and 20 differ from each other in the pressure-receiving area of the valving elements 21 and 22, the set load of the valve springs 23 and 24, and so forth. The valve opening pressure of the first poppet valve 19 is set lower than the valve opening pressure of the second poppet valve 20. The first and second poppet valves 19 and 20 may be made equal in the pressure-receiving area of the valving elements 21 and 22 but different only in the set load of the valve springs 23 and 24, or made equal in the set load of the valve springs 23 and 24 but different only in the pressure-receiving area of the valving elements 21 and 22 so that the valve opening pressure of the first poppet valve 19 is set lower than the valve opening pressure of the second poppet valve 20. In this embodiment, no large difference is provided in the pressure-receiving area of the valving elements 21 and 22, but some difference is provided in the set load of the valve springs 23 and 24, whereby the valve opening pressure of the first poppet valve 19 is set lower than the valve opening pressure of the second poppet valve 20.

In the sub-passage 18, a fixed orifice 27 is provided at the upstream side (cylinder upper chamber 2A side), and a pilot control valve 28 is provided at the downstream side (cylinder lower chamber 2B side). A portion of the sub-passage 18 between the fixed orifice 27 and the pilot control valve 28 is communicated with the back-pressure chambers 25 and 26 of the first and second poppet valves 19 and 20. The pilot control valve 28 (pressure control valve) has a valving element 29 urged toward its valve closing position by a valve spring 30. When the cylinder upper chamber 2A side pressure in the sub-passage 18 has reached a control pressure, the valving element 29 is moved in the valve opening direction against the urging force of the valve spring 30. The control pressure can be adjusted by varying the set load of the valve spring 30 with the thrust of a plunger 32 of a proportional solenoid 31, (that is, by varying the electric current supplied to a coil 33).

It should be noted that the piston 5 is provided with a compression passage (not shown) for communication between the cylinder upper and lower chambers 2A and 2B and a compression damping valve (not shown) comprising an orifice, a disk valve and so forth to generate damping force by controlling the flow of hydraulic fluid in the compression passage during the compression stroke of the piston rod 6.

The following is a description of the operation of the embodiment arranged as stated above.

During the extension stroke of the piston rod 6, the hydraulic fluid in the cylinder upper chamber 2A is pressurized to flow into the cylinder lower chamber 2B through the sub-passage 18, thus generating damping force according to the fixed orifice 27 and the control pressure of the pilot control valve 28. When the pressure in the cylinder upper chamber 2A reaches the valve opening pressures of the first and second poppet valves 19 and 20, the poppet valves 19 and 20 open sequentially to allow the hydraulic fluid in the cylinder upper chamber 2A to flow to the cylinder lower chamber 2B through the first and second main passages 16 and 17. Thus, damping force is generated by the first and second poppet valves 19 and 20. At this time, the gas in the reservoir 4 expands, and an amount of hydraulic fluid corresponding to an amount by which the piston rod 6 withdraws from the cylinder 2 flows out from the reservoir 4 and passes through the extension hydraulic fluid passage 12 of the base valve 10 to flow into the cylinder lower chamber 2B while opening the check valve 14.

Thus, damping force can be controlled directly by adjusting the control pressure of the pilot control valve 28, i.e. by varying the electric current supplied to the coil 33 of the proportional solenoid 31 to thereby change the set load of the valve spring 30. At this time, if the control pressure of the pilot control valve 28 is increased, the pressure at the upstream side of the pilot control valve 28 in the sub-passage 18 increases, and this pressure is transmitted to the back-pressure chambers 25 and 26 of the first and second poppet valves 19 and 20. Consequently, the valve opening pressures of the first and second poppet valves 19 and 20 are also increased. Thus, the valve opening pressures of the first and second poppet valves 19 and 20 can be simultaneously controlled by adjusting the control pressure of the pilot control valve 28. Therefore, the control range of damping force can be widened.

The first and second poppet valves 19 and 20 differ from each other in the valve opening characteristics. Accordingly, when the pressure in the cylinder upper chamber 2A increases, that is, when the piston speed increases, the first poppet valve 19 opens first, and then the second poppet valve 20 opens. Because the first and second poppet valves 19 and 20 open sequentially, damping force in the initial stage rises stepwisely in response to an increase in the piston speed. Thus, the damping force can be increased more gradually than in a system arranged otherwise. Consequently, it is possible to increase the degree of freedom for setting damping force characteristics and hence possible to obtain ideal damping force characteristics. In addition, it is possible to minimize the generation of vibration and noise when the damping force control valve (main damping valves) is opened.

Figure 2:
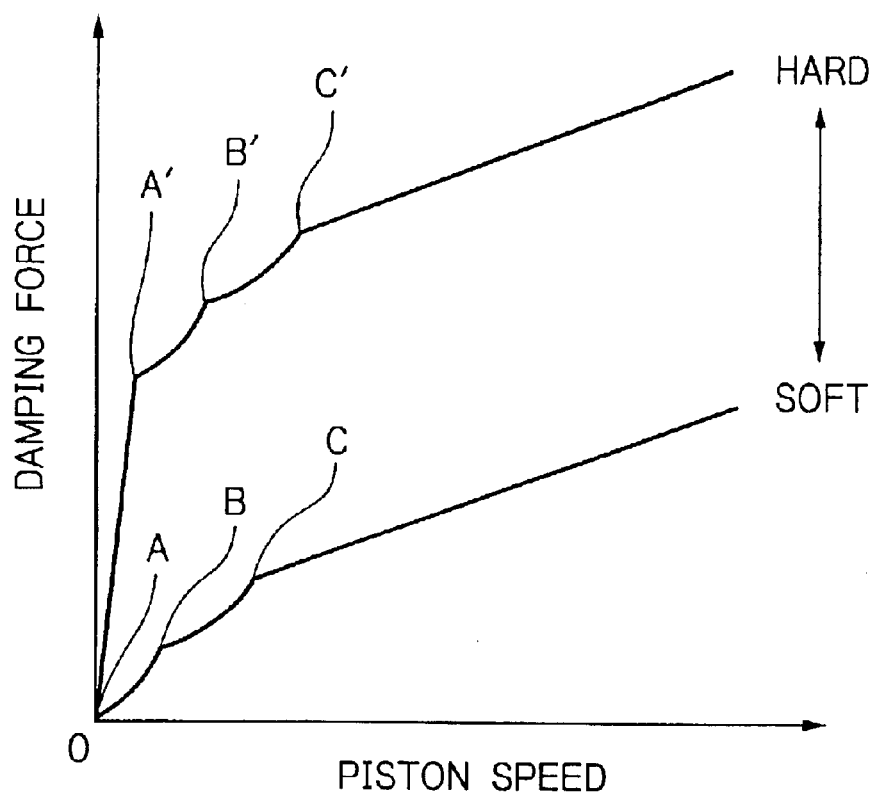
FIG. 2 is a graph showing extension-side damping force characteristics of the damping force control type hydraulic shock absorber shown in FIG. 1.

FIG. 2 shows damping force characteristics during the extension stroke of the piston rod 6. In FIG. 2, points A, B and C show the valve opening points of the pilot control valve 28, the first poppet valve 19 and the second poppet valve 20, respectively, for "soft" damping force characteristics. Points A', B' and C' show the valve opening points of the pilot control valve 28, the first poppet valve 19 and the second poppet valve 20, respectively, for "hard" damping force characteristics.

Further, because a poppet valve is used as a main damping valve of the pilot-operated damping force control valve and a coil spring is used as the valve spring, mechanical strength can be increased in comparison to the conventional structure using a disk valve. In addition, variations in the set load can be minimized, and hence stable damping force can be obtained.

During the compression stroke of the piston rod 6, the hydraulic fluid in the cylinder lower chamber 2B is pressurized to flow into the cylinder upper chamber 2A through the compression hydraulic fluid passage in the piston 5, thus allowing damping force to be generated by the compression damping force generating valve in the same way as in the conventional hydraulic shock absorber. At this time, an amount of hydraulic fluid corresponding to an amount by which the piston rod 6 enters the cylinder 2 flows out from the cylinder lower chamber 2B and passes through the compression hydraulic fluid passage 13 of the base valve 10 to flow into the reservoir 4 through the compression damping force generating mechanism 15, causing the gas in the reservoir 4 to be compressed.

Next, a second embodiment of the present invention will be described with reference to FIGS. 4 and 5. It should be noted that the second embodiment is an example of the present invention that almost corresponds to the structure of the first embodiment, while its illustration being made more specifically. Therefore, portions of the second embodiment that correspond to those of the first embodiment are denoted by the same reference numerals, and a description of the same portions is properly omitted in the following.

Figure 4:
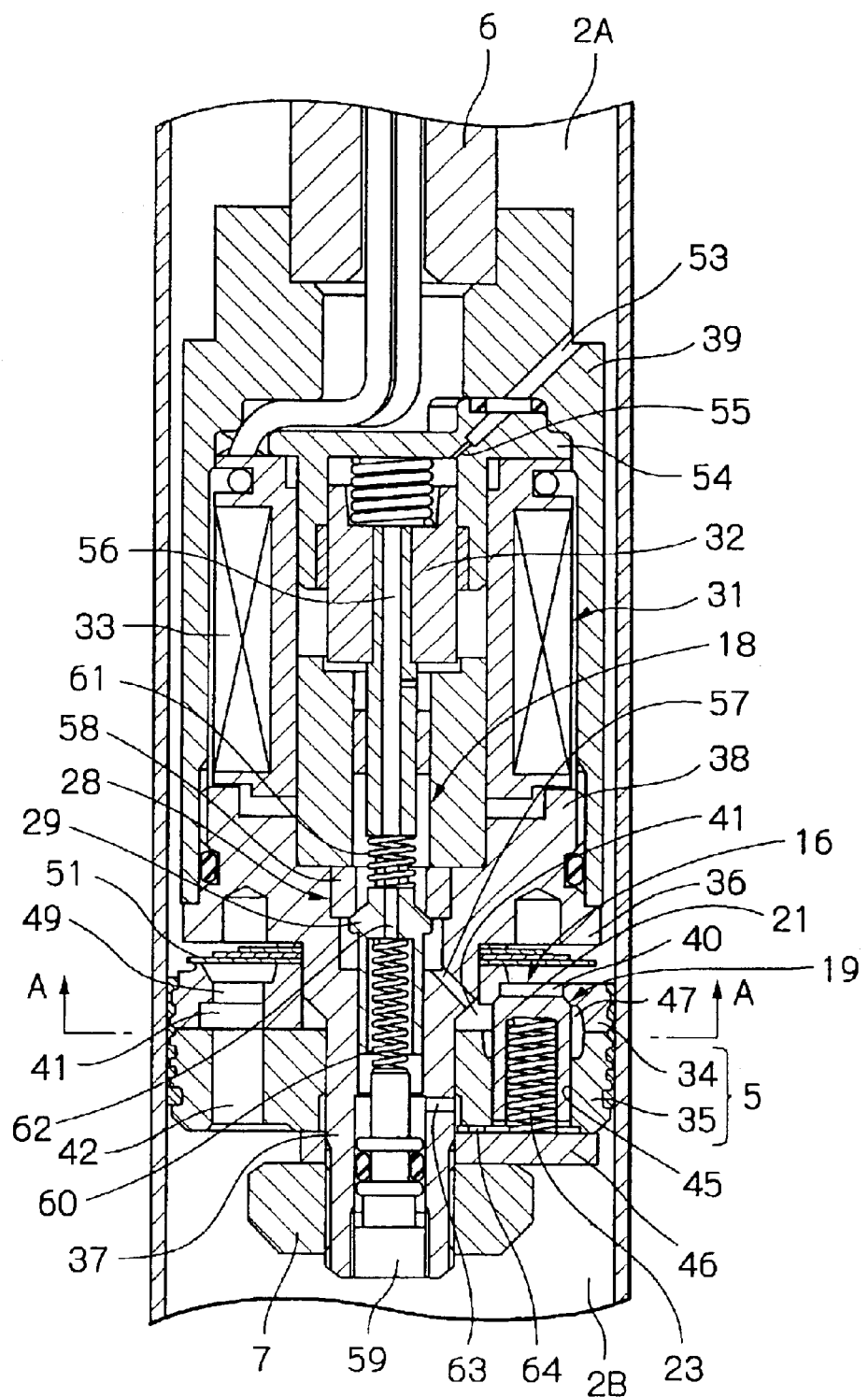
FIG. 4 is a vertical sectional view taken along the line B—B in FIG. 5, showing a piston part as an essential part of a damping force control type hydraulic shock absorber according to a second embodiment of the present invention.
Figure 5:
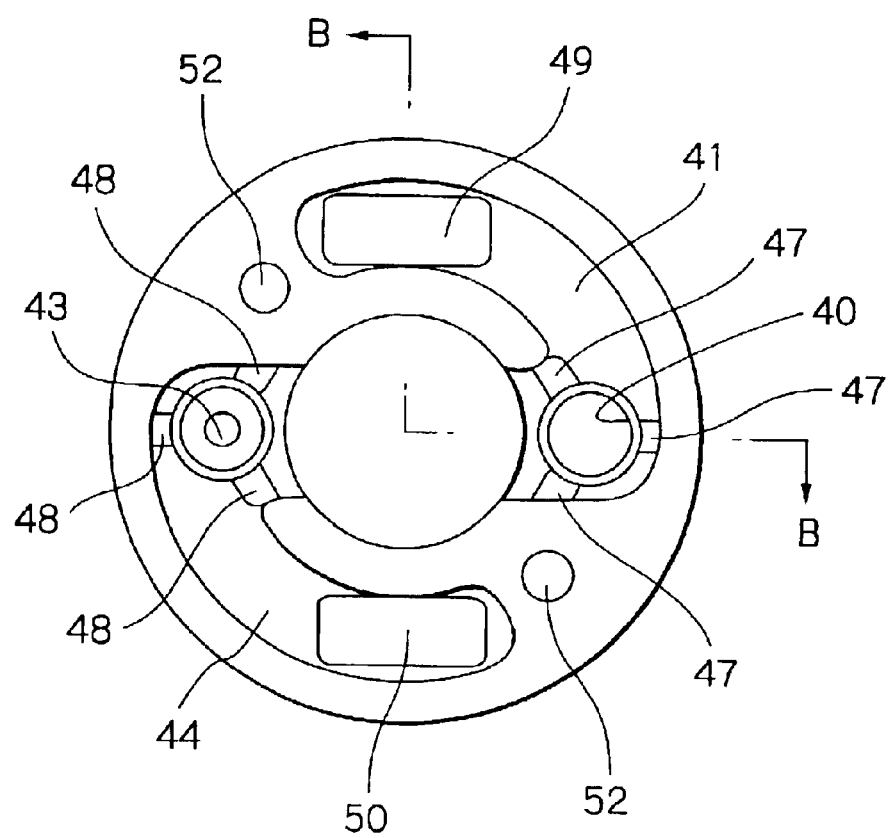
FIG. 5 is an end view of a piston member of the damping force control type hydraulic shock absorber shown in FIG. 4, as seen from the direction of arrow A—A.

As shown in FIGS. 4 and 5, a piston 5 in the second embodiment comprises two piston members 34 and 35 splittable in the axial direction. The piston members 34 and 35 are pierced with a small-diameter portion 37 of a cylindrical piston bolt 36. A nut 7 is screwed onto the distal end of the small-diameter portion 37, thereby allowing the piston members 34 and 35 to be connected to the piston bolt 36 as one unit. A casing 39 for accommodating a proportional solenoid 31 is screwed onto a large-diameter portion 38 at the proximal end of the piston bolt 36. The casing 39 is substantially in the shape of a cylinder, one end of which is closed. One end portion of the piston rod 6 is connected to the bottom of the casing 39.

A first extension main passage 16 comprises an axial opening 40 provided in the piston member 34, a groove 41 formed in a joint surface of the piston member 34 that joins with the piston member 35, and an axial hydraulic fluid passage 42 provided in the piston member 35. The opening 40 of the piston member 34 and the hydraulic fluid passage 42 of the piston member 35 are spaced from each other at an angle of approximately 90° about the center of the piston. Similarly, a second extension main passage 17 comprises an axial opening 43 provided in the piston member 34, a groove 44 formed in a joint surface of the piston member 34 that joins with the piston member 35, and an axial hydraulic fluid passage (not shown) provided in the piston member 35.

A first poppet valve 19 has a valving element 21 fitted in a valve bore 45 that is formed in the piston member 35 to face the opening 40. When the valving element 21 is separate from a valve seat formed on the edge of the opening 40, the first extension main passage 16 is open. When the valving element 21 rests on the valve seat, the first extension main passage 16 is closed. One end of the valve bore 45 is closed with a plate 46 secured to the end of the piston member 35 to form a back-pressure chamber 25 at the back of the valving element 21. A valve spring 23 is provided between the valving element 21 and the plate 46.

Similarly, a second poppet valve 20 (not shown in FIG. 4) has a valving element 22 fitted in a valve bore that is formed in the piston member 35 to face the opening 43. When the valving element 22 is separate from a valve seat formed on the edge of the opening 43, the second extension main passage 17 is open. When the valving element 22 rests on the valve seat, the second extension main passage 17 is closed. In addition, a back-pressure chamber 26 is formed by the plate 46. A valve spring 24 is interposed between the valving element 22 and the plate 46.

Three guide projections 47 are formed in the groove 41 of the piston member 34 to support the outer peripheral portion of the valving element 21. Similarly, three guide projections 48 are formed in the groove 44 of the piston member 34 to support the outer peripheral portion of the valving element 22. With this arrangement, the support rigidity of the valve elements 21 and 22 is increased so that the valve elements 21 and 22 can move smoothly.

A compression passage 49 extends axially through the piston member 34 so as to communicate through the groove 41 with the hydraulic fluid passage 42 of the piston member 35, which constitutes the first extension main passage 16. Similarly, a compression passage 50 (see FIG. 5) extends axially through the piston member 34 so as to communicate through the groove 44 with the hydraulic fluid passage of the piston member 35 that constitutes the second extension main passage 17. In addition, the piston member 34 is provided at its end with a compression damping valve 51 comprising an orifice and a disk valve to generate damping force by controlling the flow of hydraulic fluid in the compression passages 49 and 50.

The piston members 34 and 35 are connected together as one unit by inserting positioning pins (not shown) provided on the piston member 35 into positioning holes 52 of the piston member 34. In this state, the necessary cylinder bores, openings, valve seats, guide projections, passages, etc. are machined, whereby the desired coaxiality and finishing accuracy can be obtained easily.

A sub-passage 18 comprises a hydraulic fluid passage 53 provided in the bottom of the casing 39, a fixed orifice 55 provided in a retainer 54 of a proportional solenoid 31 accommodated in the casing 39, a hydraulic fluid passage 56 formed in a plunger 32 of the proportional solenoid 31, the interior of the piston bolt 36, and a hydraulic fluid passage 57 provided in a side wall of the small-diameter portion 37 of the piston bolt 36 to communicate with the groove 41 of the piston member 34.

A pilot control valve 28 is disposed in the piston bolt 36. The pilot control valve 28 has a valving element 29 guided in the small-diameter portion 37. When the valve element 29 is separate from an annular valve seat 58 fitted in the large-diameter portion 38, the sub-passage 18 is open. When the valve element 29 rests on the valve seat 58, the sub-passage 18 is closed. The small-diameter portion 37 has a spring retainer 59 screwed into the distal end thereof. A valve spring 60 is interposed between the spring retainer 59 and the valving element 29. A valve spring 61 is interposed between the distal end of the plunger 32 of the proportional solenoid 31 and the distal end of the valving element 29. Control pressure is adjusted by varying the set load of the valve spring 61 with the thrust of the plunger 32 of the proportional solenoid 31, that is, by varying the electric current supplied to the coil 33. The valve spring 61 interposed between the plunger 32 and the valving element 29 allows the mass of the valving element 29 to decrease, thereby improving response.

A portion of the sub-passage 18 between the fixed orifice 55 and the pilot control valve 28 is communicated with the back-pressure chambers 25 and 26 of the first and second poppet valves 19 and 20 through a hydraulic fluid passage 62 formed in the valving element 29, the interior of the small-diameter portion 37, a hydraulic fluid passage 63 provided in the side wall of the small-diameter portion 37, and a groove 64 formed in the joint surface of the piston member 35 that joins with the plate 46.

The following is a description of the operation of the embodiment arranged as stated above.

During the extension stroke of the piston rod 6, damping force can be controlled directly by adjusting the control pressure of the pilot control valve 28, (i.e. by varying the electric current supplied to the coil 33 of the proportional solenoid 31). At the same time, the valve opening pressures of the first and poppet valves 19 and 20 can be controlled in the same way as in the first embodiment. At this time, because the first and second poppet valves 19 and 20 are opened or closed sequentially, damping force rises stepwisely in response to an increase in the piston speed. Thus, the damping force can be increased more gradually than in a system arranged otherwise. Consequently, it is possible to increase the degree of freedom for setting damping force characteristics and hence possible to obtain ideal damping force characteristics. In addition, it is possible to minimize the generation of vibration and noise when the damping force control valve (main damping valves) is opened.

During the compression stroke of the piston rod 6, damping force is generated by restricting the flow of hydraulic fluid in the compression passages 49 and 50 with the compression damping valve 51.

In addition, the piston 5 has a split structure, and the piston assembly is provided with the first and second extension main passages 16 and 17, the first and second poppet valves 19 and 20, the compression passages 49 and 50, and the compression damping valve 51, as stated above. Consequently, the space efficiency can be increased, and the piston assembly can be reduced in size.

Although in the foregoing first and second embodiments the extension main passage is provided with two different poppet valves, it should be noted that the present invention is not necessarily limited to the described structure. The arrangement may be such that three or more poppet valves that are sequentially opened or closed are provided, and these valves are controlled by a single pilot control valve. Further, although in the first and second embodiments the damping force control mechanism is provided for the extension side, the present invention is not necessarily limited to the described arrangement. The damping force control mechanism may be provided for only the compression side or for each of the extension and compression sides.

As has been detailed above, the damping force control type hydraulic shock absorber according to the present invention has a pilot-operated damping force control valve comprising a plurality of main damping valves having different valve opening characteristics and a single pilot control valve for controlling the plurality of main damping valves. Accordingly, the plurality of main damping valves are sequentially opened or closed, thereby allowing damping force to be controlled stepwisely. Consequently, it is possible to increase the degree of freedom for setting damping force characteristics. That is, damping force is allowed to rise, in response to an increase in the piston speed, more gradually than in a system arranged otherwise. Accordingly, it is possible to obtain ideal damping force characteristics. In addition, it is possible to minimize the generation of vibration and noise when the damping force control valve (main damping valves) is opened.

It should be noted that the present invention is not necessarily limited to the foregoing embodiments but can be modified in a variety of ways without departing from the gist of the present invention.

What is claimed is:

1. A damping force control type hydraulic shock absorber comprising:

a cylinder having hydraulic fluid sealed therein;

a piston slidably fitted in said cylinder;

a piston rod having a first end connected to said piston, and having a second end extending outside of said cylinder;

an extension hydraulic fluid passage for allowing the hydraulic fluid to flow therethrough in response to an extension sliding movement of said piston;

a compression hydraulic fluid passage for allowing the hydraulic fluid to flow therethrough in response to a compression sliding movement of said piston; and a pilot-operated damping force control valve in one of said extension hydraulic fluid passage and said compression hydraulic fluid passage, and being operable to generate damping force by controlling flow of the hydraulic fluid in said one of said extension hydraulic fluid passage and said compression hydraulic fluid passage, said pilot-operated damping force control valve including:
    a plurality of main damping valves having valve opening characteristics different from each other; and
    a single pilot control valve for controlling a pilot pressure of each of said plurality of main damping valves.

2. The damping force control type hydraulic shock absorber of claim 2, wherein each of said main damping valves comprises a poppet valve having a coil valve spring.

3. The damping force control type hydraulic shock absorber of claim 2, wherein said one of said extension hydraulic fluid passage and said compression hydraulic fluid passage is located in said piston, said piston comprising a plurality of piston members joined together.

4. The damping force control type hydraulic shock absorber of claim 3, wherein said one of said extension hydraulic fluid passage and said compression hydraulic fluid passage comprises a circumferentially-extending portion, said circumferentially-extending portion comprising a circumferential groove in a first one of said piston members, a second one of said piston members facing said groove.

5. The damping force control type hydraulic shock absorber of claim 1, wherein said one of said extension hydraulic fluid passage and said compression hydraulic fluid passage is located in said piston, said piston comprising a plurality of piston members joined together.

6. The damping force control type hydraulic shock absorber of claim 5, wherein said one of said extension hydraulic fluid passage and said compression hydraulic fluid passage comprises a circumferentially-extending portion, said circumferentially-extending portion comprising a circumferential groove in a first one of said piston members, a second one of said piston members facing said groove.

7. The damping force control type hydraulic shock absorber of claim 1, wherein said pilot-operated damping force control valve includes only one pilot control valve for controlling a pilot pressure of each of said plurality of main damping valves.

8. The damping force control valve is located in said extension hydraulic fluid passage.

9. The damping force control type hydraulic shock absorber of claim 8, wherein said pilot-operated damping force control valve comprises a first pilot-operated damping force control valve, further comprising a second pilot-operated damping force control valve located in said compression hydraulic fluid passage.

10. The damping force control type hydraulic shock absorber of claim 1, wherein said pilot-operated damping force control valve is located in said compression hydraulic fluid passage.

11. The damping force control type hydraulic shock absorber of claim 1, wherein each of said main damping valves has a valve spring and a valve element shaped to close said each of said main damping valves.

12. The damping force control type hydraulic shock absorber of claim 11, wherein a set load of said valve spring of each of said main damping valves is different.

13. The damping force control type hydraulic shock absorber of claim 11, wherein a size of a pressure receiving area of said valve element of each of said main damping valves is different.

\* \* \* \* \*